US012746749B2

(12) United States Patent
Hatta

(10) Patent No.: US 12,746,749 B2
(45) Date of Patent: Sep. 29, 2026

(54) PRINTING METHOD AND PRINTING APPARATUS

(71) Applicant: BROTHER KOGYO KABUSHIKI KAISHA, Nagoya (JP)

(72) Inventor: Fumika Hatta, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 225 days.

(21) Appl. No.: 18/883,283

(22) Filed: Sep. 12, 2024

(65) Prior Publication Data

US 2025/0108610 A1 Apr. 3, 2025

(30) Foreign Application Priority Data

Sep. 29, 2023 (JP) ................................ 2023-170169

(51) Int. Cl.
*B41J 2/045* (2006.01)
*B41J 2/14* (2006.01)

(52) U.S. Cl.
CPC ......... *B41J 2/04581* (2013.01); *B41J 2/0457* (2013.01); *B41J 2/14274* (2013.01); *B41J 2002/14306* (2013.01)

(58) Field of Classification Search
CPC .. B41J 2/04581; B41J 2/04541; B41J 2/0457; B41J 2/04548; B41J 2/14274; B41J 2002/14306; B41J 2002/14258
See application file for complete search history.

(56) References Cited

U.S. PATENT DOCUMENTS

2009/0109256 A1* 4/2009 Nagate ................. B41J 2/14233 347/85
2018/0079205 A1* 3/2018 Yamashita ........... B41J 2/04568
2018/0281387 A1 10/2018 Hatta
2020/0307177 A1* 10/2020 Nakano ................ B41J 2/04551

FOREIGN PATENT DOCUMENTS

JP 5991069 B2 9/2016
JP 2018034474 A 3/2018
JP 2018171853 A 11/2018

* cited by examiner

*Primary Examiner* — Kristal Feggins
(74) *Attorney, Agent, or Firm* — Element IP, PLC

(57) ABSTRACT

A printing method using a printing apparatus, the printing apparatus including: a liquid ejecting head including: a channel substrate having an individual channel; and a piezoelectric actuator having an individual electrode, a high potential electrode and a low potential electrode and applying pressure to liquid inside the individual channel, a driving power source circuit electrically connected to the individual electrode; a high potential power source circuit electrically connected to the high potential electrode; and a conveyor to convey a medium, the printing method comprising: ejecting the liquid from the liquid ejecting head with respect to the medium conveyed by the conveyor so as to print an image on the medium; and changing an output voltage value of each of the driving power source circuit and the high potential power source circuit while printing the image on the medium.

12 Claims, 11 Drawing Sheets

| | BEFORE CHANGE | AFTER CHANGE |
|---|---|---|
| POWER SOURCE CIRCUIT 21 | 20.1V | 20.4V |
| POWER SOURCE CIRCUIT 22 | 20.3V | 20.7V |
| POWER SOURCE CIRCUIT 23 | 20.0V | 20.3V |
| POWER SOURCE CIRCUIT 24 | 19.8V | 20.2V |
| POWER SOURCE CIRCUIT 25 | 19.7V | 19.9V |
| POWER SOURCE CIRCUIT 26 | 23.3V | 23.7V |

| | BEFORE CHANGE | AFTER CHANGE |
|---|---|---|
| POWER SOURCE CIRCUIT 21 | 20.4V | 20.1V |
| POWER SOURCE CIRCUIT 22 | 20.7V | 20.3V |
| POWER SOURCE CIRCUIT 23 | 20.3V | 20.0V |
| POWER SOURCE CIRCUIT 24 | 20.2V | 19.8V |
| POWER SOURCE CIRCUIT 25 | 19.9V | 19.7V |
| POWER SOURCE CIRCUIT 26 | 23.7V | 23.3V |

PRINTING METHOD AND PRINTING APPARATUS

REFERENCE TO RELATED APPLICATIONS

This application claims priority from Japanese Patent Application No. 2023-170169 filed on Sep. 29, 2023. The entire content of the priority application is incorporated herein by reference.

BACKGROUND ART

A known liquid ejecting apparatus includes an ink-jet head having a driving element and a substrate having a driving power source circuit and a high potential power source circuit, wherein the driving power source circuit and the high potential power source circuit are electrically connected to the driving element. In the liquid ejecting apparatus, in a case where the output voltage value of the driving power source circuit needs to be changed and a difference between the output voltage value and a target voltage value of the driving power source circuit is greater than a predetermined value, the output voltage value of the driving power source circuit is changed to the target voltage value in a stepwise manner. With this, the output voltage value of the driving power source circuit can be stabilized in a short period of time in each of steps of changing the output voltage value.

SUMMARY

In the known liquid ejecting apparatus described above, however, in a case where only the output voltage value of the driving power source circuit is changed, the difference between the output voltage value of the driving power source circuit and the output voltage value of the high potential power source circuit is changed before and after changing the output voltage value of the driving power source circuit. As a result, the behavior of a piezoelectric actuator is changed before and after changing the output voltage value of the driving power source circuit, which in turn leads to such a possibility that printing quality might be unstable.

The present teaching has been made to solve the above-described problem. An object of the present teaching is to provide a printing method and a printing apparatus, each capable of changing the output voltage value of the driving power source circuit while maintaining the printing quality.

According to a first aspect of the present teaching, a printing method using a printing apparatus is provided. The printing apparatus includes: a liquid ejecting head including: a channel substrate having an individual channel; and a piezoelectric actuator having an individual electrode, a high potential electrode, and a low potential electrode, and configured to apply pressure to liquid inside the individual channel; a driving power source circuit electrically connected to the individual electrode; a high potential power source circuit electrically connected to the high potential electrode; and a conveyor configured to convey a medium. The printing method includes: ejecting the liquid from the liquid ejecting head with respect to the medium conveyed by the conveyor so as to print an image on the medium; and changing an output voltage value of the driving power source circuit and an output voltage value of the high potential power source circuit while printing the image on the medium.

According to a second aspect of the present teaching, a printing apparatus is provided. The printing apparatus includes: a liquid ejecting head including: a channel substrate having an individual channel, and a piezoelectric actuator having an individual electrode, a high potential electrode, and a low potential electrode, and configured to apply pressure to liquid inside the individual channel; a driving power source circuit electrically connected to the individual electrode; a high potential power source circuit electrically connected to the high potential electrode; a conveyor configured to convey a medium; and a controller configured to control the liquid ejecting head and the conveyor. The controller is configured to: eject the liquid from the liquid ejecting head with respect to the medium conveyed by the conveyor so as to print an image on the medium; and change an output voltage value of the driving power source circuit and an output voltage value of the high potential power source circuit while printing the image on the medium.

According to the first and second aspects of the present teaching, the printing method, and the printing apparatus, each capable of changing the output voltage value of the driving power source circuit while maintaining the printing quality, are provided.

DESCRIPTION

The following describes a printing apparatus according to an embodiment of the present teaching, with reference to FIGS. 1 to 13B.

Figure 1:
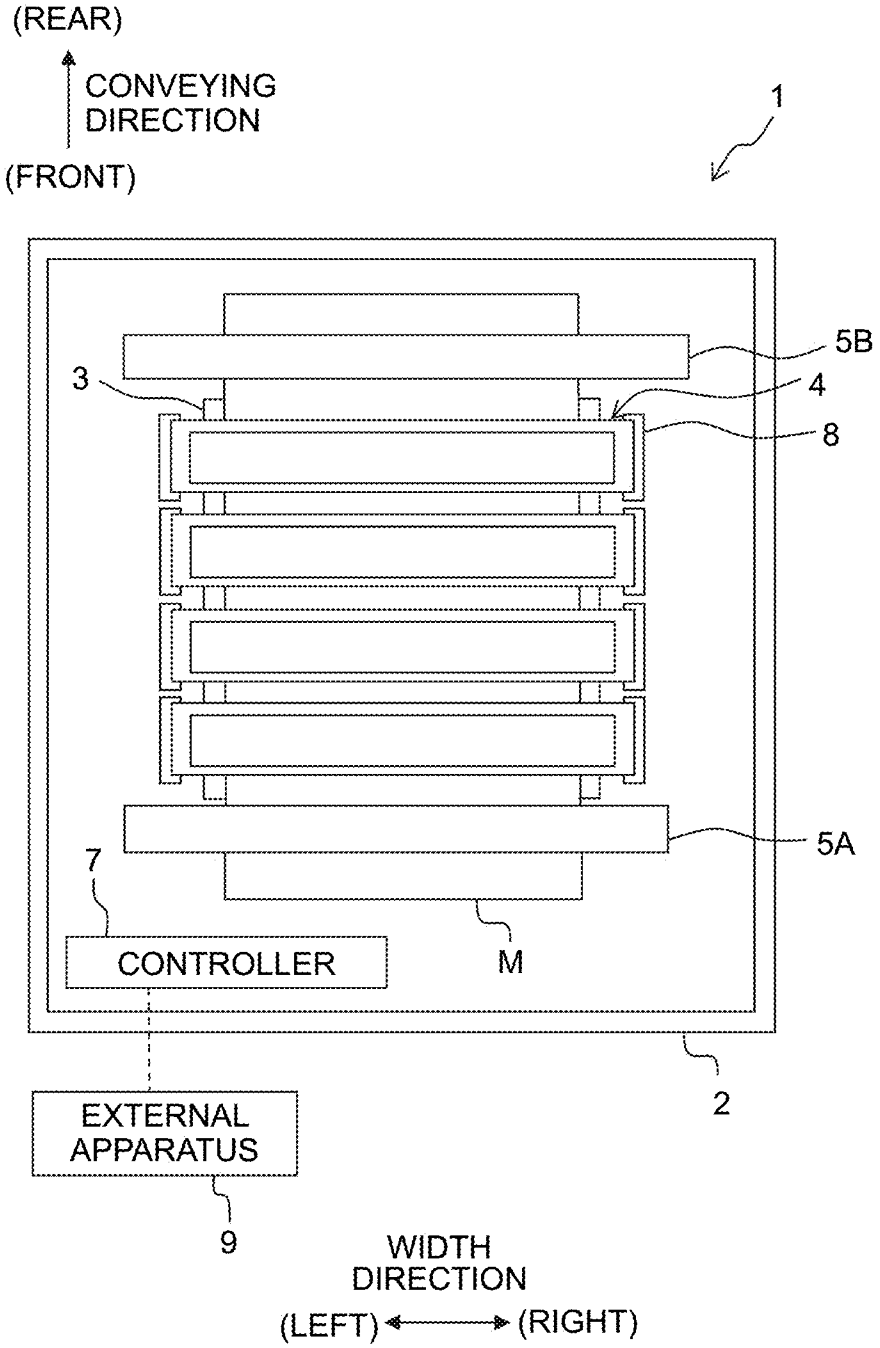
FIG. 1 is a plan view depicting an example of a configuration of main parts of a printing apparatus of an embodiment.

In FIG. 1, an upstream side in a conveying direction of a medium M is defined as a front of the printing apparatus 1, and a downstream side in the conveying direction is defined as a rear of the printing apparatus 1. Further, a direction which is parallel to a conveyance surface on which the medium M is conveyed (a surface parallel to a sheet surface of FIG. 1) and which is orthogonal to the conveying direction is defined as a width direction. Note that a left side of the drawing is a left of the printing apparatus 1, and a right side of the drawing is a right of the printing apparatus 1. Furthermore, a direction perpendicular to the conveyance surface of the medium M (a direction orthogonal to the sheet surface of FIG. 1) is defined as an up-down direction of the printing apparatus 1. In FIG. 1, a front side of the sheet surface is up, and a rear side of the sheet surface is down. In the following, the front, rear, left, right, up, and down are used as appropriate so as to describe the present embodiment.

As depicted in FIG. 1, the printing apparatus 1 includes a platen 3, four line heads 4, two conveying rollers 5A and 5B, and a controller 7 which are accommodated inside a casing 2.

The medium M, such as a recording sheet, is placed on an upper surface of the platen 3. The four line heads 4 are disposed above the platen 3 so as to face the platen 3. The four line heads 4 are aligned in the front-rear direction. The two conveying rollers 5A and 5B are disposed, respectively, in front of and behind the platen 3. Each of the two conveying rollers 5A and 5B is driven by a non-illustrated motor, and conveys the medium M on the platen 3 to the downstream in the conveying direction (rearward). Note that although the present embodiment has a configuration including the four line heads 4, the number of line heads 4 is not limited to four. Further, the two conveying rollers 5A and 5B are an example of a “conveyor” of the present teaching.

Figure 3:
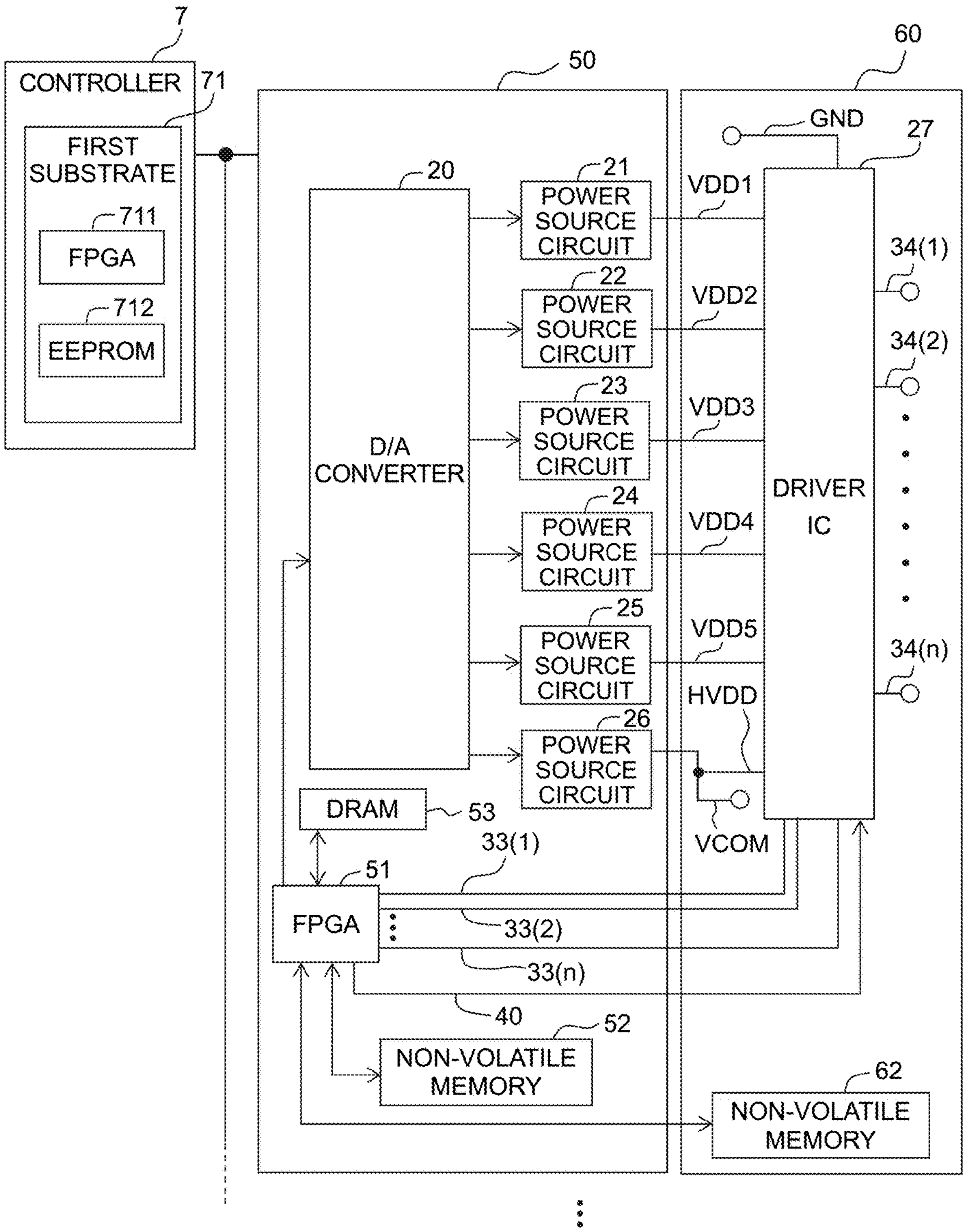
FIG. 3 is a block diagram depicting an example of a configuration of a second substrate and a flexible circuit board, connected to the second substrate, which are included in the head of the embodiment.

As depicted in FIG. 3, the controller 7 includes a first substrate 71. The first substrate 71 includes an FPGA (Field Programmable Gate Array) 711, and further includes a non-illustrated ROM (Read Only Memory), a non-illustrated RAM (Random Access Memory), and an EEPROM (Electrically Erasable Programmable Read-Only Memory; EEPROM is a registered trade mark of Renesas Electronics Corporation) 712. The controller 7 can mutually communicate with an external apparatus 9 (see FIG. 1) such as a personal computer. The controller 7 is configured to control the operation of each of the four line heads 4 and the conveying rollers 5A and 5B based on an instruction from the external apparatus 9 or an operating part (not depicted in the drawings) included in the printing apparatus 1, and in accordance with a program stored in the ROM. Note that a CPU (Central Processing Unit) or an MPU (Microprocessor Unit) may be used instead of the FPGA 711.

For example, the controller 7 controls the motor which drives the conveying rollers 5A and 5B to thereby cause the conveying rollers 5A and 5B to convey the medium M in the conveying direction. Further, the controller 7 controls each of the four line heads 4 so as to cause the four line heads 4 to eject ink toward the medium M. With this, an image is printed on the medium M. Note that the medium M may be a roll-shaped sheet.

Four head holding parts 8 are attached to the casing 2, corresponding to the four line heads 4, respectively. The four head holding parts 8 are aligned in the front-rear direction above the platen 3 and between the conveying rollers 5A and 5B. Each of the line heads 4 is held by one of the four head holding parts 8.

The four line heads 4 are configured to eject, respectively, inks of four colors which are cyan (C), magenta (M), yellow (Y), and black (K). One color ink, of the four color inks, is supplied to each of the four line heads 4 from a non-illustrated ink tank.

Figure 2:
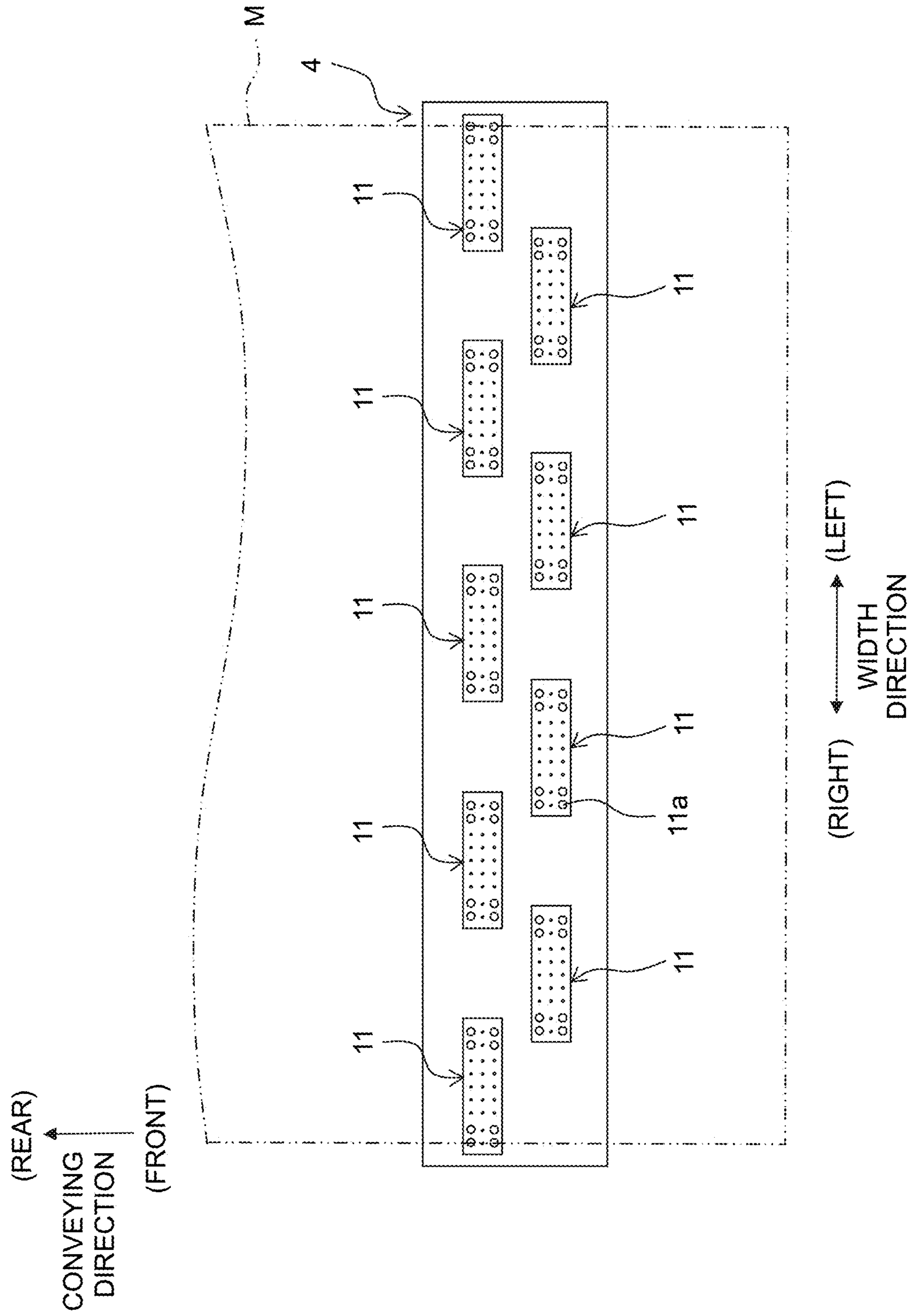
FIG. 2 is a bottom view depicting an example of a head of the embodiment.

As depicted in FIG. 2, each of the four line heads 4 includes nine heads 11. The nine heads 11 are arranged in a staggered manner in two rows along the width direction. Since one color ink is supplied to one line head 4, the one color ink is ejected from the nine heads 11 included in one line head 4. Note that although the present embodiment has a configuration wherein each of the four line heads 4 includes the nine heads 11, the number of heads 11 is not limited to nine.

In the bottom surface of each of the nine heads 11 of the present embodiment, 1680 nozzles 11*a* are open, and construct a plurality of nozzle rows arranged side by side in the width direction. Namely, each of the nine heads 11 has a plurality of nozzles 11*a*. Further, each of the nozzle rows includes nozzles 11*a* which are aligned in the conveying direction. Note that although the present embodiment is configured so that each of the nine heads 11 includes the 1680 nozzles 11*a*, the number of nozzles 11*a* is not limited to 1680.

Further, each of the heads 11 includes driving elements 111 (see FIG. 7), and a second substrate 50 and a flexible circuit board 60 which are depicted in FIG. 3. The number of driving elements 111 is the same as the number of nozzles 11*a*. Since the printing apparatus 1 of the present embodiment includes the four line heads 4 and each of the four line heads 4 includes the nine heads 11, the printing apparatus 1 includes 36 heads 11. Accordingly, the number of second substrates 50 is also 36, and the number of flexible circuit boards 60 connected to the second substrates 50 is also 36. As depicted in FIG. 3, the first substrate 71 of the controller 7 is connected to 36 second substrates 50. Note that in FIG. 3, for the sake of convenience, only one of the second substrates 50 and only one of the flexible circuit boards 60 are depicted.

As depicted in FIG. 3, the second substrate 50 includes an FPGA 51, a non-volatile memory 52 such as an EEPROM, a DRAM 53 configured to temporarily store raster data received from the controller 7, a D/A converter 20, and power source circuits 21 to 26. Note that in the present embodiment, although the second substrate 50 includes the six power source circuits 21 to 26, the number of power source circuits is not limited to six. Further, note that each of the power source circuits 21 to 25 is an example of a “driving power source circuit” of the present teaching, and the power source circuit 26 is an example of a “high potential power source circuit” of the present teaching. Further, the flexible circuit board 60 includes a non-volatile memory 62 such as an EEPROM, and a driver IC 27.

Under control of the FPGA 711 included in the first substrate 71, the FPGA 51 outputs a digital setting signal for setting the output voltage value of each of the power source circuits 21 to 26, to the D/A converter 20.

The D/A converter 20 converts the digital setting signal outputted by the FPGA 51 into an analogue setting signal and outputs the analogue setting signal to each of the power source circuits 21 to 26.

Each of the power source circuits 21 to 26 may be a DC/DC converter which is constructed of a plurality of electronic parts such as an FET, an inductor, a resistor, and an electrolytic capacitor. Each of the power source circuits 21 to 26 outputs voltage (driving voltage) designated by the setting signal to the driver IC 27. Namely, the FPGA 51 adjusts the output voltage value of each of the power source circuits 21 to 26. In the present embodiment, different output voltage values are previously set, respectively, in the power source circuits 21 to 26. The details of the configurations of the power source circuits 21 to 26 will be described later.

The driver IC 27 is connected to the power source circuits 21 to 25 via wires VDD1 to VDD5, respectively, and is connected to the power source circuit 26 via a wire HVDD. Note that the power source circuit 26 is connected to the driving element 111 (described later; see FIG. 7) via a wire VCOM. The wire HVDD and the wire VCOM are two wires divided from a wire drawn from the power source circuit 26 at an intermediate part of a route thereof.

Figure 5:
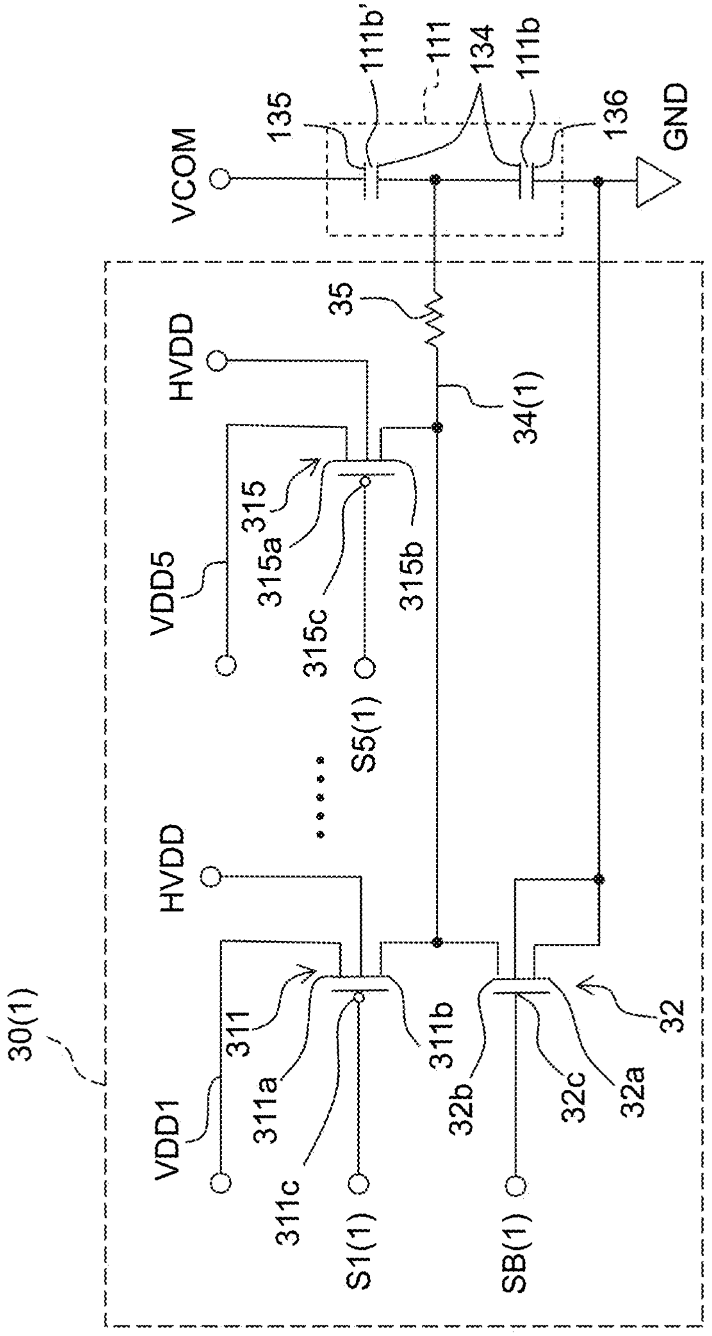
FIG. 5 is a circuit diagram depicting an example of a configuration of a waveform generating circuit included in the head of the embodiment.

The power source circuit 26 may be used as a power source voltage for the VCOM of the driving element 111, or an HVDD (high side back gate voltage) of PMOS transistors 311 to 315 (described later; see FIG. 5).

The driver IC 27 is connected to n signal lines 34(1) to 34(*n*) (the "n" is a natural number which is 2 or more; in the present embodiment, the "n" is equal to the number of driving elements 111 possessed by one head 11, namely, 1680). The driver IC 27 is connected to n driving elements 111 via the n signal lines 34(1) to 34(*n*), respectively. Each of the signal lines 34(1) to 34(*n*) is connected to an individual electrode of one of the driving elements 111.

The non-volatile memory 52 stores nozzle IDs identifying the plurality of nozzles 11*a*. Further, the non-volatile memory 52 stores, for example, corresponding relationship between the n nozzles 11*a* and the five power source circuits 21 to 25. Namely, each of the plurality of nozzles 11*a* is associated with any one of the plurality of power source circuits 21 to 25. Note that the corresponding relationship may be stored in the non-volatile memory 62 included in the flexible circuit board 60, rather than in the non-volatile memory 52.

Further, the driver IC 27 is connected to the FPGA 51 via n control lines 33(1) to 33(*n*) and a control line 40.

The control lines 33(1) to 33(*n*) are provided so as to correspond to n waveform generating circuits 30(1) to 30(*n*) (see FIG. 4, described later) possessed by the driver IC 27. A signal for controlling FETs included in each of the n waveform generating circuits 30(1) to 30(*n*) is propagated to one of the control lines 33(1) to 33(*n*). According to this signal, each of the n waveform generating circuits 30(1) to 30(*n*) generates a driving signal by which one of the driving elements 111 is driven, and outputs the generated driving signal to the one of the driving elements 111 via one of the signal lines 34(1) to 34(*n*).

Further, a control signal for controlling n selectors 90(1) to 90(*n*) (described later), which are possessed by the driver IC 27, is transmitted to the control line 40. The FPGA 51 controls each of the n selectors 90(1) to 90(*n*) to thereby select a power source circuit for generating the driving signal which is to be outputted to one of the signal lines 34(1) to 34(*n*).

Figure 4:
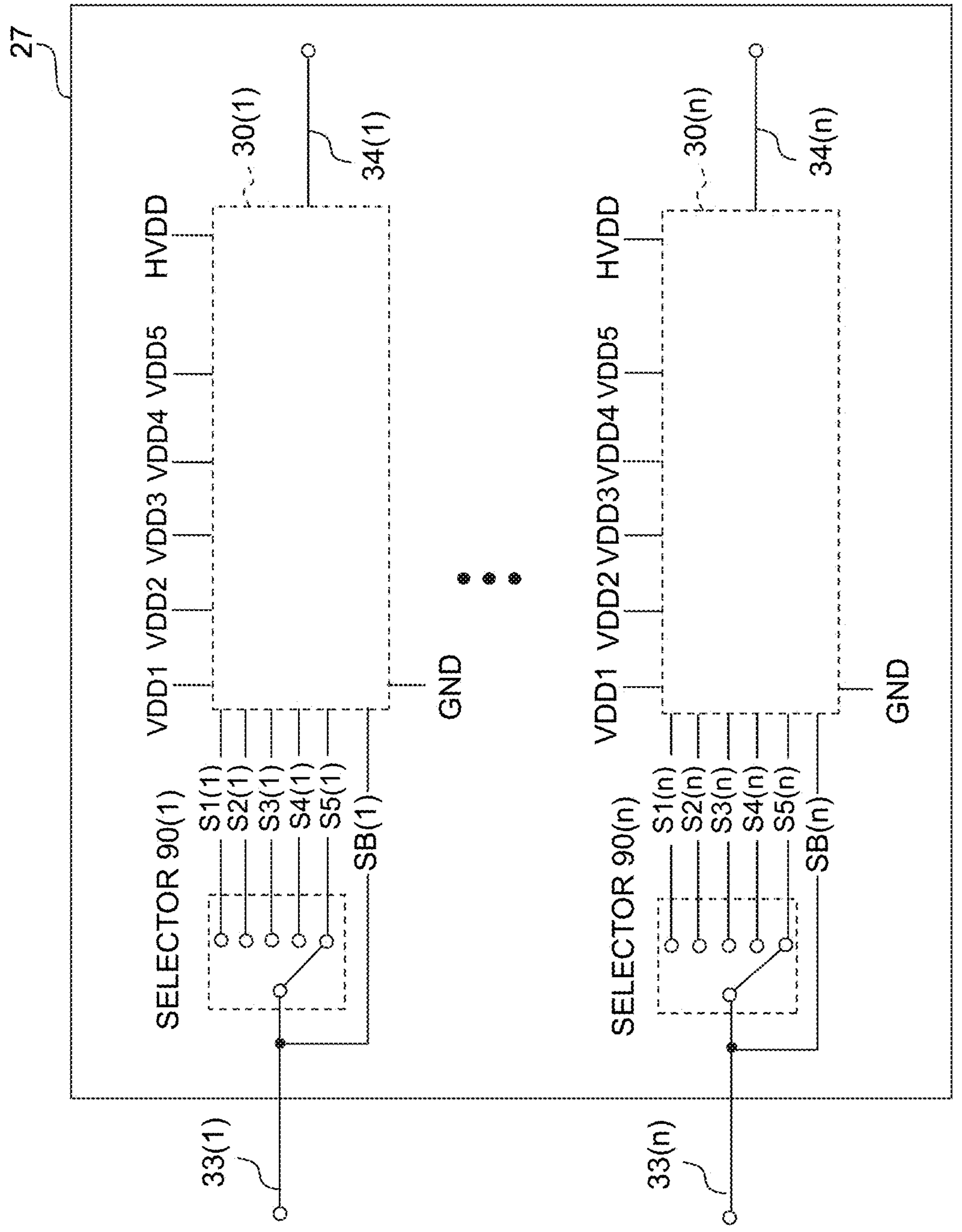
FIG. 4 is a view depicting an example of a configuration of a circuit included in a driver IC.

Next, an example of the circuit configuration included in the driver IC 27 will be described with reference to FIG. 4. As depicted in FIG. 4, the driver IC 27 includes n waveform generating circuits 30(1) to 30(*n*) and n selectors 90(1) to 90(*n*).

The waveform generating circuits 30(1) to 30(*n*) are provided so as to correspond to the n driving elements 111 included in each of the heads 11. Namely, the waveform generating circuits 30(1) to 30(*n*) are provided so as to correspond, respectively, to the n nozzles 11*a* included in each of the heads 11. Further, the selector 90(1) to 90(*n*) are provided so as to correspond, respectively, to the waveform generating circuits 30(1) to 30(*n*). Namely, the selector 90(1) to 90(*n*) correspond, respectively, to the n driving elements 111. Each of the selectors 90(1) to 90(*n*) is a constituent element of hardware constructed of a plurality of FETs disposed in the driver IC 27.

The driver IC 27 includes n circuit configurations of which number is the same as the number of nozzles 11*a*. In the following, a circuit configuration provided between the control line 33(1) and the signal line 34(1) will be described. In the driver IC 27, the selector 90(1) and the waveform generating circuit 30(1) are disposed between the control line 33(1) and the signal line 34(1).

The control line 33(1) from the FPGA 51 is connected to the selector 90(1). The control line 33(1) is branched at an intermediate part of a route connecting the FPGA 51 to the selector 90(1). A control line SB(1) branched from the control line 33(1) is connected to the waveform generating circuit 30(1).

The selector 90(1) and the waveform generating circuit 30(1) are connected by five control lines S1(1) to S5(1). The selector 90(1) connects one control line among the five control lines S1(1) to S5(1) to the control line 33(1), in accordance with an instruction of the FPGA 51.

Five wires connected, respectively, to the above-described wires VDD1 to VDD5, a wire connected to the wire HVDD, and a wire connected to a wire GND are connected to the waveform generating circuit 30(1). Namely, the waveform generating circuit 30(1) is connected to the power source circuits 21 to 25 via, respectively, the wires VDD1 to VDD5, and is connected to the power source circuit 26 via the wire HVDD.

Next, an example of a configuration of each of the waveform generating circuits 30(1) to 30(*n*) included in the head 11 of the present embodiment will be described, with reference to FIG. 5. Note that since the waveform generating circuits 30(1) to 30(*n*) have similar configurations, the waveform generating circuit 30(1) will be described in the following. The waveform generating circuit 30(1) includes five PMOS (P-type Metal Oxide Semiconductor) transistors 311 to 315 (only two PMOS transistors are depicted in FIG. 5), one NMOS (N-type Metal Oxide Semiconductor) transistor 32, and a resistor 35. The waveform generating circuit 30(1) is connected to the individual electrode of one of the driving elements 111 via the signal line 34(1).

Figure 8:
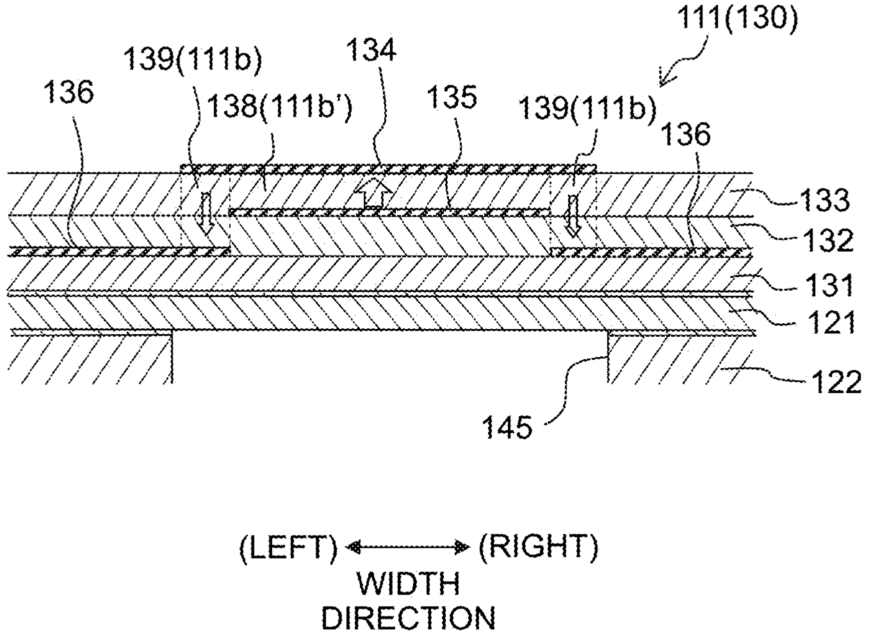
FIG. 8 is a partial cross-sectional view of the head of the embodiment.

As depicted in FIG. 8, each of the driving elements 111 of the present embodiment is a piezoelectric element including a first active part 138 which is sandwiched between the individual electrode 134 and a high potential electrode 135, and second active parts 139 sandwiched between the individual electrode 134 and low potential electrodes 136, with respect to one of the pressure chambers 145. Accordingly, as depicted in FIGS. 5 and 8, the driving element 111 includes a capacitor 111*b*' and a capacitor 111*b*.

The wires VDD1 to VDD5 are connected to five source terminals 311*a* to 315*a* of the five PMOS transistors 311 to 315, respectively. A source terminal 32*a* of the NMOS transistor 32 is connected to the ground. Namely, the PMOS transistors 311 to 315 are connected to the power source circuits 21 to 25 via the wires VDD1 to VDD5, respectively.

Control lines S1(1) to S5(1) are connected to gate terminals 311*c* to 315*c* of the PMOS transistors 311 to 315, respectively. Further, a control line SB(1) is connected to a gate terminal 32*c* of the NMOS transistor 32.

Further, drain terminals 311*b* to 315*b* of the five PMOS transistors 311 to 315, respectively, are connected to one end of the resistor 35. Furthermore, a drain terminal 32*b* of the NMOS transistor 32 is connected to the one end of the resistor 35. The other end of the resistor 35 is connected to the individual electrode 134 (the other end of the capacitor 111*b*' and one end of the capacitor 111*b*) of the driving element 111. The high potential electrode 135 (one end of the capacitor 111*b*') of the driving element 111 is connected to the VCOM, and the low potential electrode 136 (the other end of the capacitor 111*b*) of the driving element 111 is connected to the ground.

In a case where the FPGA 51 outputs a signal of low level ("L") to the control line 33(1), any one PMOS transistor, which is included in the PMOS transistors 311 to 315 and which is connected to a signal line selected by the above-described selector 90(1) is in an ON state. The capacitor 111*b* is charged by the voltage supplied from any one of the power source circuits 21 to 25, and the capacitor 111*b*' is discharged. On the other hand, in a case where the FPGA 51 outputs a signal of high level ("H") to the control line 33(1), the NMOS transistors 32 is in the ON state, and the capacitor 111*b*' is charged by the voltage outputted from any one of the power source circuits 21 to 25, and the capacitor 111*b* is discharged. By causing the capacitors 111*b* and 111*b*' to perform the charging and the discharging in an alternate manner, the driving element 111 is deformed and the ink is ejected from an ejection port of the nozzle 11*a*.

Namely, the driving signal by which the driving element 111 is driven is outputted to the signal line 34(1). The selector 90(1) selects one control line, among the five control lines S1(1) to S1(5), which is to be connected to the control line 33(1), thereby enabling the selection of the power source circuit, which is to generate the driving signal, from the power source circuits 21 to 25.

Figure 6:
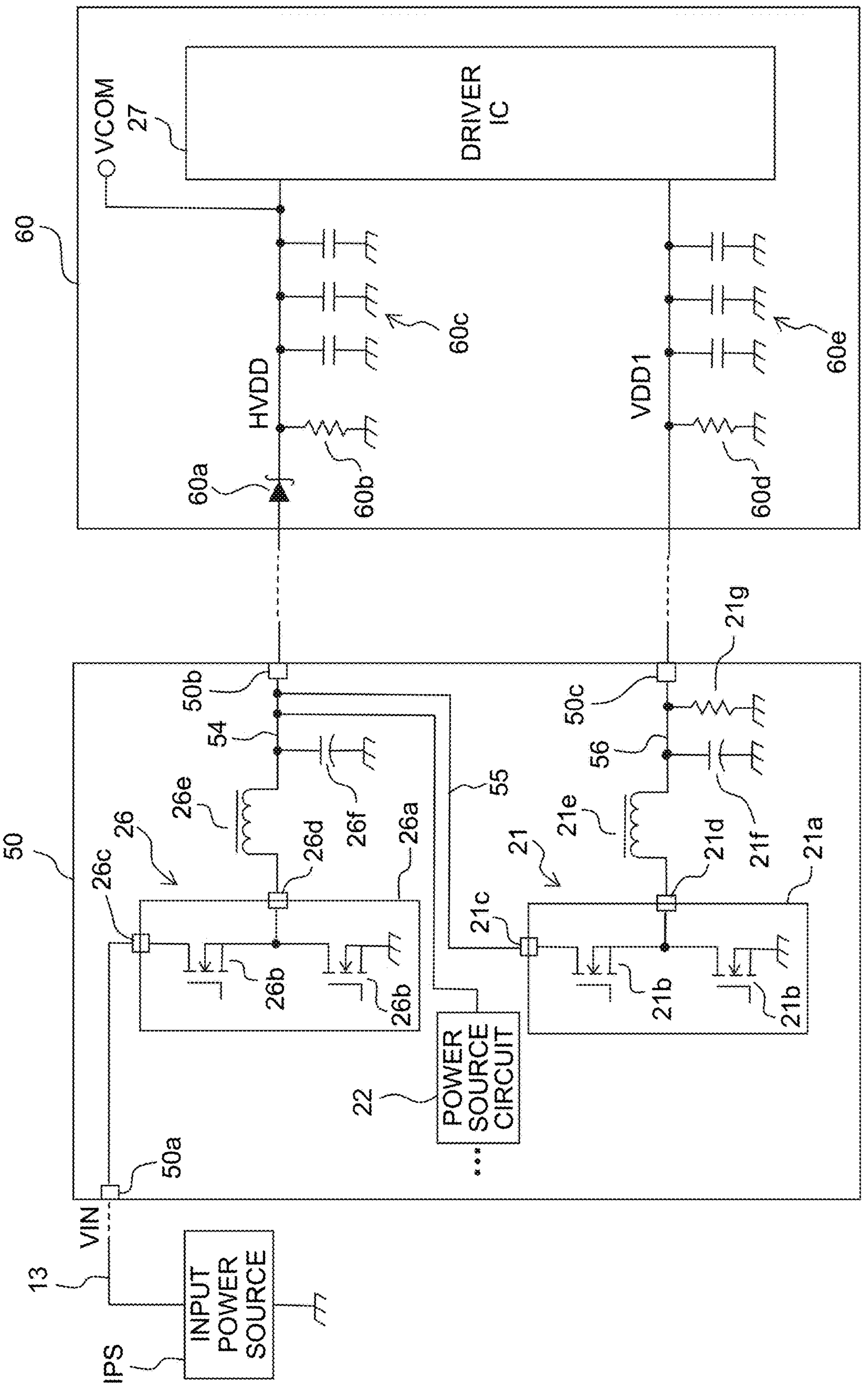
FIG. 6 is a view depicting an example of a configuration of a power source circuit included in the second substrate.

Next, the configuration of the power source circuits 21 to 26 will be described, with reference to FIG. 6. The power source circuit 26 includes a power source IC 26*a*. The power source IC 26*a* includes two FETs 26*b*, an input terminal 26*c*, and an output terminal 26*d*. The output terminal 26*d* is connected to a first output terminal 50*b* of the second substrate 50, via a first line 54. In the first line 54, a coil 26*e* is connected in series between the output terminal 26*d* and the first output terminal 50*b*. In the first line 54, one end of a capacitor 26*f* is connected between the coil 26*e* and the first output terminal 50*b*. The other end of the capacitor 26*f* is connected to the ground. The input terminal 26*c* of the power source IC 26*a* is connected to an input power source IPS via an input terminal 50*a* of the second substrate 50. The input power source IPS and the input terminal 50*a* of the second substrate 50 are connected via a power source cable 13.

The power source circuit 21 includes a power source IC 21*a*. The power source IC 21*a* includes two FETs 21*b*, an input terminal 21*c*, and an output terminal 21*d*. The output terminal 21*d* is connected to a second output terminal 50*c* of the second substrate 50, via a second line 56. In the second line 56, a coil 21*e* is connected in series between the output terminal 21*d* and the second output terminal 50*c*. In the second line 56, one end of a capacitor 21*f* is connected between the coil 21*e* and the second output terminal 50*c*. The other end of the capacitor 21*f* is connected to the ground. In the second line 56, one end of a resistor 21*g* is connected between the one end of the capacitor 21*f* and the second output terminal 50*c*. The other end of the resistor 21*g* is connected to the ground.

A branch line 55 is branched from the first line 54, at a location between the first output terminal 50*b* and the one end of the capacitor 26*f*, and is connected to the input terminal 21*c* of the power source circuit 21. Namely, voltage on the output side of the power source circuit 26 is inputted to the power source circuit 21. Each of the power source circuits 22 to 25 includes a power source IC, similar to the power source circuit 21; the power source IC includes two FETs, an input terminal, and an output terminal. Similarly, to the power source circuit 21, each of the output terminals of the power source terminals 22 to 25 is connected to an output terminal, of the second substrate 50, corresponding thereto, and a capacitor and a resistor are connected between each of the output terminals of the power source circuits 21 to 25 and the output terminal, of the second substrate, corresponding thereto. Further, each of the input terminals of the power source circuits 22 to 25 is connected between the first output terminal 50*b* and the one end of the capacitor 26*f*. Namely, the input terminals of the power sources IC of the five power source circuits 21 to 25 are connected in parallel and between the first output terminal 50*b* and the one end of the capacitor 26*f*. The voltage on the output side of the power source circuit 26 is inputted also to the input terminals of the four power source circuits 22 to 25, similarly to the power source circuit 21. Namely, the input terminals of the five power source circuits 21 to 25 and the first output terminal 50*b* are connected in parallel to the output terminal 26*d* of the power source circuit 26 via the first line 54.

The six power source circuits 21 to 26 are, for example, switching regulators. The maximum output wattage of each of the five power source circuits 21 to 25 is smaller than output wattage of the power source circuit 26. The maximum output current of the power source IC of each of the five power source circuits 21 to 25 is smaller than the maximum output current of the power source IC 26*a* of the power source circuit 26. The withstanding voltage of the power source IC of each of the power source circuits 21 to 25 may be lower than the withstanding voltage of the power source IC 26*a* of the power source circuit 26. Namely, a power source circuit of which output wattage is small may be used, a power source IC of which maximum output current is small may be used, and a power source IC of which withstanding voltage is low may be used. The FET 21*b* of the power source circuit 21, namely the withstanding voltage of a switching element, may be lower than the withstanding voltage of the FET 26*b* of the power source circuit 26.

Next, the relationship between the power source circuit 21 and the flexible circuit board 60 will be described. The description of the relationship between the flexible circuit board 60 and each of the power source circuits 22 to 25 having the same configuration as that of the power source circuit 21 will be omitted.

The flexible circuit board 60 includes a diode 60*a*, a resistor 60*b* and a plurality of capacitors 60*c*. An input terminal of the diode 60*a* is connected to the first output terminal 50*b* of the second substrate 50, via a wire. An output terminal of the diode 60*a* is connected to the driver IC 27 via the wire HVDD. Further, the wire VCOM branched from the wire HVDD is connected to the high potential electrode 135 of the driving element 111, not via the driver IC 27. Namely, the power source circuit 26 is connected to the high potential electrode 135 of the driving element 111 via the first output terminal 50*b*, the diode 60*a* and the wire VCOM.

One end of the resistor 60*b* is connected between the output terminal of the diode 60*a* and the driver IC 27. The other end of the resistor 60 is connected to the ground. One ends, respectively, of the plurality of capacitors 60*c* are connected in parallel between the one end of the resistor 60*b* and the driver IC 27. The other ends, respectively, of the plurality of capacitors 60*c* are connected to the ground. The diode 60*a* and the resistor 60*b* may be disposed in the second substrate 50. Further, a relay substrate may be disposed between the second substrate 50 and the flexible circuit board 60, and the diode 60*a* and the resistor 60*b* may be disposed in the relay substrate.

The flexible circuit board 60 includes a resistor 60*d* and a plurality of capacitors 60*e*. The second output terminal 50*c* of the second substrate 50 is connected to the driver IC 27 via a wire VDD1. One end of the resistor 60*d* is connected between the second output terminal 50*c* and the driver IC 27. The other end of the resistor 60*d* is connected to the ground. One ends, respectively, of the plurality of capacitors 60*e* are connected in parallel between the one end of the resistor 60*d* and the driver IC 27. The other ends, respectively, of the plurality of capacitors 60*e* are connected to the ground.

Figure 7:
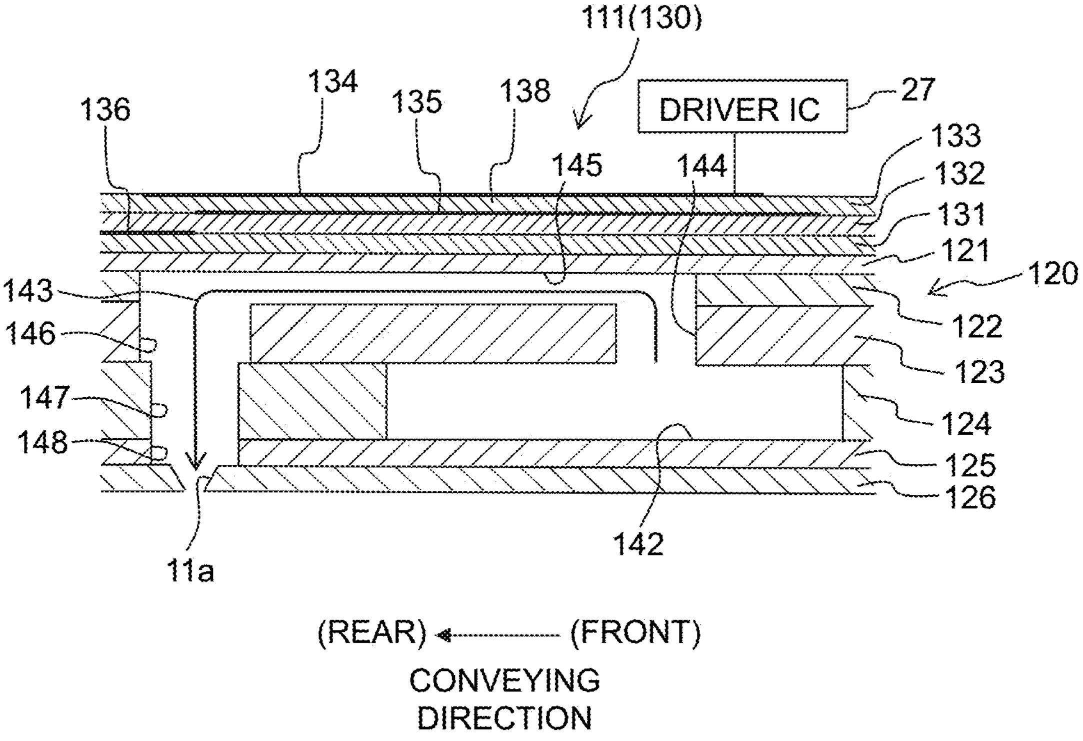
FIG. 7 is a cross-sectional view of the head of the embodiment.

Next, the configuration of each of the heads 11 will be described. As depicted in FIG. 7, the head 11 includes a channel substrate 120 and a piezoelectric actuator 130.

Channel Substrate 120

The channel substrate 120 has a plurality of nozzles 11*a*, a plurality of individual channels 143 (see FIG. 7) each of which communicates with one of the plurality of nozzles 11*a*, and a manifold 142 (see FIG. 7) which commonly communicates with the plurality of individual channels 143. The channel substrate 120 is constructed of an ink sealing film 121 and metallic plates 122 to 126 which are stacked on one another in the up-down direction.

The plate 122 has through holes defining a plurality of pressure chambers 145. As depicted in FIG. 7, the plate 123 has through holes defining communication channels 144 and communicating channels 146 each of which is provided for one of the plurality of pressure chambers 145. The communication channels 144 and 146 overlap, in the up-down direction, with one end and the other end, respectively, in the front-rear direction of each of the plurality of pressure chambers 145 corresponding thereto. The plate 124 has through holes defining communication channels 147 each of which is provided for one of the communication channels 146. The plate 125 has through holes defining communication channels 148 each of which is provided for one of the communicating channels 147. Each of the communicating channels 147 and each of the communicating channels 148 overlap, in the up-down direction, with one of the communicating channels 146 corresponding thereto. The nozzle plate 126 has through holes each of which defines one of the plurality of nozzles 11*a*. Each of the plurality of nozzles 11*a* overlaps, in the up-down direction, with one of the communicating channels 148. Further, each of the plurality of individual channels 143 includes a communicating channel 144, a pressure chamber 145, a communicating channel 146, a communicating channel 147, a communicating channel 148, and a nozzle 11*a*.

Furthermore, the plate 124 has a through hole defining the manifold 142. The communicating channels 144 of the individual channels 143 overlap, in the up-down direction, with the manifold 142. With this, each of the individual channels 143 communicates with the manifold 142. Moreover, a non-illustrated ink supply port is formed in an upper surface of the plate 122, at an area in which the ink sealing film 121 and the piezoelectric actuator 130 are not formed. The ink supply port communicates with the manifold 142 via through holes penetrating, respectively, the plates 122 and 123.

The ink sealing film 121 is made of a low ink-permeable material such as stainless steel. The ink sealing film 121 is adhered to the upper surface of the plate 122 and seals all the pressure chambers 145 formed in the plate 122.

In the channel substrate 120 having the above-described configuration, the ink inside the non-illustrated ink tank is supplied to the manifold 142 via the ink supply port. The ink supplied to the manifold 142 is supplied to each of the plurality of individual channels 143. Further, the piezoelectric actuator 130 is driven in the manner as described above, thereby applying pressure to the ink inside each of the plurality of individual channels 143 and causing an ink droplet to be ejected from the nozzles 11*a*.

Piezoelectric Actuator 130

The piezoelectric actuator 130 includes a plurality of driving elements 111 constructed of three piezoelectric layers 131 to 133, a plurality of individual electrodes 134, a high potential electrode 135 and a low potential electrode 136. Each of the plurality of individual driving elements 111 corresponds to one of the plurality of individual channels 143.

Each of the three piezoelectric layers 131 to 133 is formed of a piezoelectric material composed primarily of lead zirconate titanate (PZT). As depicted in FIGS. 7 and 8, the three piezoelectric layers 131 to 133 are stacked in the up-down direction. The piezoelectric layer 131 is adhered to an upper surface of the ink sealing film 121 with an adhesive.

As depicted in FIGS. 7 and 8, each of the plurality of individual electrodes 134, the high potential electrode 135 and the low potential electrode 136 are disposed on the opposite side to the ink sealing film 121, with respect to the piezoelectric layer 131.

As depicted in FIGS. 7 and 8, each of the plurality of individual electrodes 134 is disposed on an upper surface of the piezoelectric layer 133 so as to correspond to one of the plurality of pressure chambers 145. As described above, each of the plurality of individual electrodes 134 is connected to the waveform generating circuit 30 of the driver IC 27, via the signal line 34. Either high potential (VDD potential) or low potential (GND potential) is selectively applied to each of the individual electrodes 134 via the signal line 34.

As depicted in FIGS. 7 and 8, the high potential electrode 135 is disposed on an upper surface of the piezoelectric layer 132. The high potential electrode 135 corresponds to each of the plurality of pressure chambers 145 and each of the plurality of individual electrodes 134. The high potential electrode 135 overlaps, in the up-down direction, with a central part of a pressure chamber 145 corresponding thereto. Further, the high potential electrode 135 overlaps, in the up-down direction, with an individual electrode 134 corresponding thereto. The high potential electrode 135 is connected to the power source circuit 26 via a non-illustrated penetrating electrode which penetrates the piezoelectric layer 133 in the up-down direction and via the above-described wires VCOM and HVDD. Constant potential (VCOM potential), which is higher to some extent than the VDD potential, is applied to the high potential electrode 135 from the power source circuit 26.

As depicted in FIGS. 7 and 8, the low potential electrode 136 is disposed on an upper surface of the piezoelectric layer 131. Further, as depicted in FIG. 8, the low potential electrode 136 is provided as left and right low potential electrodes 136 which are disposed, respectively, on left and right sides with respect to one pressure chamber 145. A right end part of the left low potential electrode 136 overlaps, in the up-down direction, with a left end part of the pressure chamber 145 and a left end part of the individual electrode 134. A left end part of the right low potential electrode 136 overlaps, in the up-down direction, with a right end part of the pressure chamber 145 and a right end part of the individual electrode 134. As described above, the low potential electrode 136 is connected to the ground.

As depicted in FIG. 8, a part, of the piezoelectric layer 133, which is sandwiched between the individual electrode 134 and the high potential electrode 135 in the up-down direction is referred to as a first active part 138. A part of the piezoelectric layer 132 and a part of the piezoelectric layer 133, which are sandwiched between the individual electrode 134 and the low potential electrode 136 in the up-down direction, are referred to as a second active part 139. The first active part 138 is polarized mainly upward, and the second active part 139 is polarized mainly downward. With respect to each of the plurality of pressure chambers 145, the piezoelectric actuator 130 includes one first active part 138 and two second active parts 139 which sandwich the first active part 138 therebetween in the left-right direction.

The operation of a driving element 111 corresponding to one nozzle 11*a*, which is herein referred to as a "certain nozzle 11*a*", of the plurality of nozzles 11*a* will be described regarding a case of ejecting an ink droplet from the certain nozzle 11*a* as an example, with reference to FIGS. 9 and 10.

Figure 9:
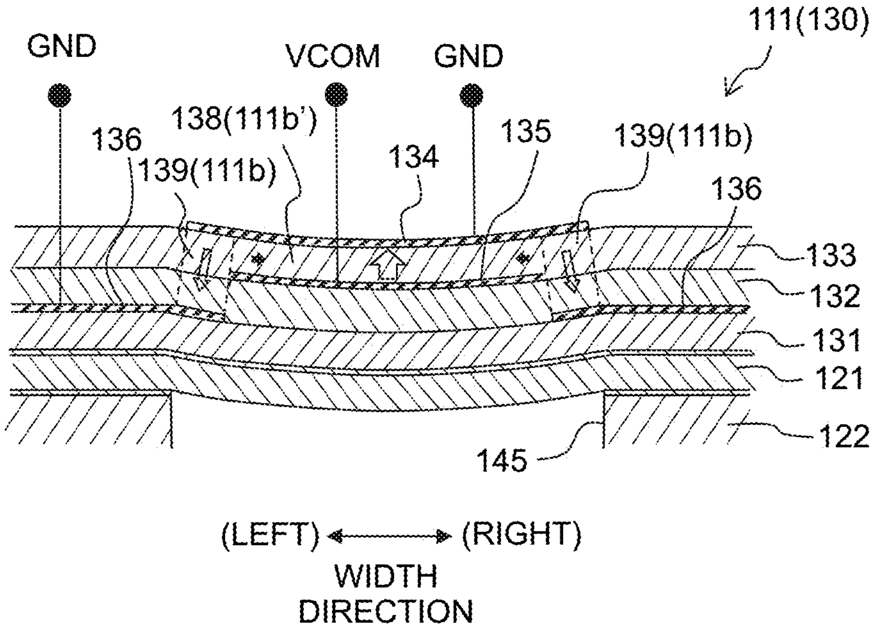
FIG. 9 is a view depicting an action of a driving element in the cross-section of FIG. 8.

Before the printer 1 starts printing, the low potential (GND potential) is applied to each of the individual electrodes 134, as depicted in FIG. 9. In this situation, an upward electric field which is oriented in the same direction as the polarization direction of the first active part 138 is generated in the first active part 138, due to a difference in potential between the individual electrode 134 and the high potential electrode 135. Accordingly, the first active part 138 is contracted in a plane direction (a direction along the left-right direction and the front-rear direction). With this, a part which is included in a stacked body constructed of the piezoelectric layers 131 to 133 and which overlaps, in the up-down direction, with a certain pressure chamber 145 corresponding to the certain nozzle 11*a* is deflexed to project toward the certain pressure chamber 145 (downward). In this situation, the volume of the certain pressure chamber 145 is decreased as compared to the case where the stacked body is flat (see FIG. 8).

Figure 10:
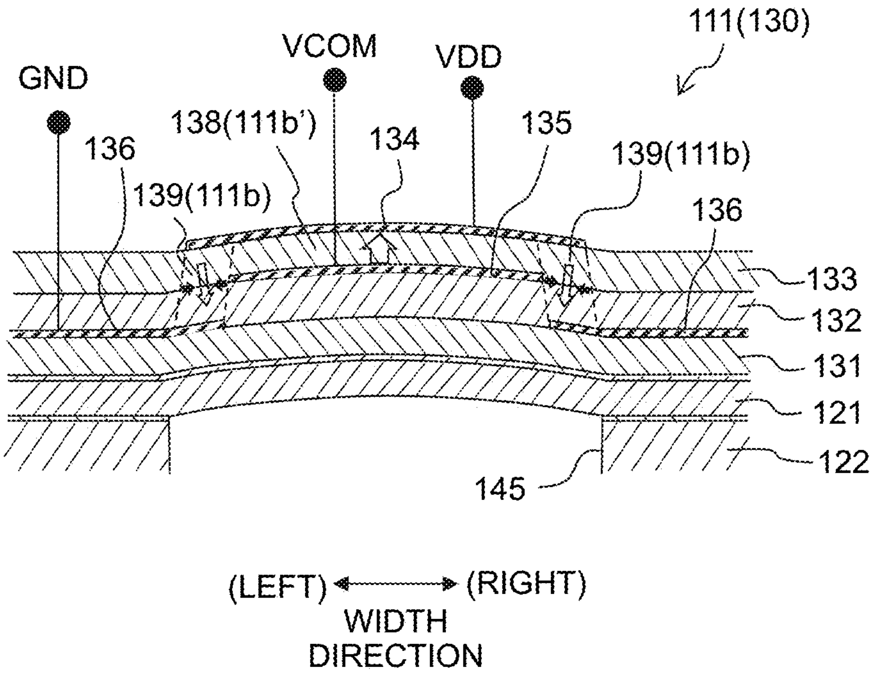
FIG. 10 is a view depicting an action of the driving element in the cross-section of FIG. 8.

In a case where the printer 1 starts printing and the ink is to be ejected from the certain nozzle 11*a*, at first, the potential of the individual electrode 134 which corresponds to the certain nozzle 11*a* is switched from the low potential (GND potential) to the high potential (VDD potential), as depicted in FIG. 10. In this situation, the difference in potential between the individual electrodes 134 and the high potential electrode 135 is decreased, thereby decreasing the contraction of the first active part 138. On the other hand, due to a difference in potential between the individual electrode 134 and the low potential electrode 136, a downward electric field oriented in the same direction as the polarization direction of the two second active parts 139 is generated in each of the two active parts 139. Accordingly, the two second active parts 139 are contracted in the plane direction. With this, the part which is included in the stacked body and which overlaps, in the up-down direction, with the certain pressure chamber 145 is deflexed to project in a direction separating away from the certain pressure chamber 145 (upward). With this, the volume of the certain pressure chamber 145 is increased, as compared with the state depicted in FIG. 9, and the ink is pulled into the certain pressure chamber 145 from the manifold 142.

Afterward, as depicted in FIG. 9, the potential of the individual electrode 134, which corresponds to the certain nozzle 11*a*, is switched from the high potential (VDD potential) to the low potential (GND potential). In this situation, there is no difference in potential between the individual electrode 134 and the low potential electrode 136. Accordingly, the contraction of the two second active parts 139 is eliminated. On the other hand, due to the difference in potential between the individual electrode 134 and the high potential electrode 135, the electric field which is oriented in the same direction as the polarization direction of the first active part 138 is generated in the first active part 138. Accordingly, the first active part 138 is contracted in the plane direction. With this, the part which is included in the stacked body constructed of the piezoelectric layers 131 to 133 and which overlaps, in the up-down direction, with the certain pressure chamber 145 is deflexed to project toward the certain pressure chamber 145 (downward). In this situation, the volume of the certain pressure chamber 145 is greatly decreased, thereby applying large pressure to the ink inside the certain pressure chamber 145, and causing the ink, which has been pulled from the manifold 142 into the certain pressure chamber 145, to be ejected from the certain nozzle 11*a* as an ink droplet.

Figure 11:
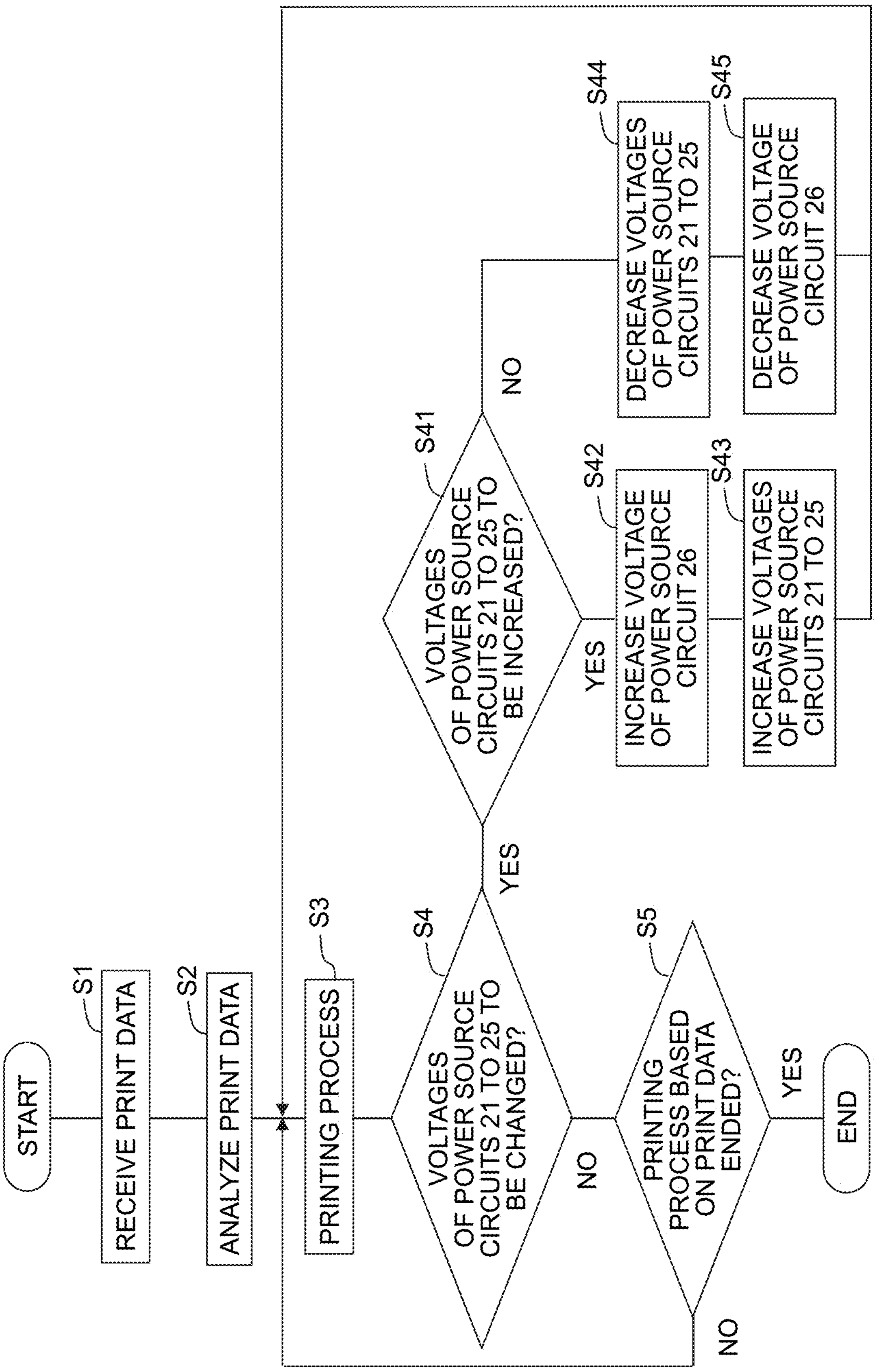
FIG. 11 is a view depicting the outline of a procedure of printing using the printing apparatus of the embodiment.

Next, an example of the procedure of printing using the printing apparatus 1 of the present embodiment will be described, with reference to FIG. 11.

In a case where the printing apparatus 1 receives the print data from the external apparatus 9 (step S1), the printing apparatus 1 analyzes the received print data (step S2) and executes a printing process (step S3) based on the result of the analysis.

In the printing process (step S3), the controller 7 of the printing apparatus 1 controls the motor driving the conveying rollers 5A and 5B so as to cause the conveying rollers 5A and 5B to convey the medium M in the conveying direction. Further, the controller 7 controls the heads 11 of each of the line heads 4 so as to cause the heads 11 to eject the ink toward the medium M which is being conveyed by the conveying rollers 5A and 5B. With this, an image is printed on the medium M. Note that, as described above, in each of the driving elements 111 included in each of the heads 11, the high potential electrode 135 is connected to the power source circuit 26, and the individual electrode 134 is connected to any one of the power source circuits 21 to 25. Namely, an output voltage value set to the power source circuit 26 is inputted to the high potential electrode 135, and an output voltage value set to any one of the power source circuits 21 to 25 as a connection destination of the individual electrode 134 is inputted to the individual electrode 134.

The controller 7 is configured to change the conveying speed of the medium M at various timings during the printing process. For example, the controller 7 increases the conveying speed of the medium M immediately after the start of the printing process from zero to a predetermined speed, and decreases the conveying speed of the medium M from the predetermined speed to zero immediately before the end of the printing process. Further, in such a case that a user is required to confirm the quality of printing during the conveyance of the medium M at the predetermined speed, the controller 7 temporarily decreases the conveying speed, based on an instruction from the user. Furthermore, in a case where the conveying speed of the medium M is changed during the printing process and a desired quality of printing is to be maintained, the ejecting frequency of the ink droplet needs to be changed in accordance with the conveying speed. In a case where driving waveforms each for driving one of the driving elements 111 are the same before and after the change of the ejecting frequency of the ink droplet, sizes of the ink droplets landed on the medium M will be different. Accordingly, in a case of changing the ejecting frequency of the ink droplet, the driving waveform needs to be changed so that the size of the ink droplet landed on the medium M is not changed. The driving waveform can be changed, for example, by changing the output voltage value of each of the power source circuits 21 to 25. Namely, in a case where the ejecting frequency of the ink droplet is changed in accordance with the conveying speed and where the size of the ink droplet landed on the medium M is decreased thereby, the size of the ink droplet to be landed on the medium M can be increased by increasing the output voltage value of each of the power source circuits 21 to 25 and by changing the driving waveform. On the other hand, in a case where the ejecting frequency of the ink droplet is changed in accordance with the conveying speed and where the size of the ink droplet landed on the medium M is increased thereby, the size of the ink droplet to be landed on the medium M can be decreased by decreasing the output voltage value of each of the power source circuits 21 to 25 and by changing the driving waveform. With this, the desired quality of printing can be maintained before and after the change of the conveying speed.

In view of this, in the present embodiment, the controller 7 determines whether the output voltage value of each of the power source circuits 21 to 25 needs to be changed, based on the conveying speed of the medium M (step S4). For example, the controller 7 calculates the conveying speed of the medium M based on a signal outputted from a non-illustrated encoder of the conveying roller 5A, and compares the peak value of the driving waveform corresponding to the ejecting frequency calculated from the conveying speed and the peak value of the current driving waveform, thereby determining whether the output voltage value of each of the power source circuits 21 to 25 needs to be changed. Specifically, in a case where the peak value of the driving waveform corresponding to the ejecting frequency calculated from the conveying speed and the peak value of the current driving waveform are different from each other, the controller 7 determines that the output voltage value of each of the power source circuits 21 to 25 needs to be changed (step S4: YES). On the other hand, in a case where the peak value of the driving waveform corresponding to the ejecting frequency calculated from the conveying speed and the peak value of the current driving waveform are the same, the controller 7 determines that the output voltage value of each of the power source circuits 21 to 25 does not need to be changed (step S4: NO).

In a case where the controller 7 determines that the output voltage value of each of the power source circuits 21 to 25 needs to be changed (step S4: YES), the controller 7 determines whether the output voltage value of each of the power source circuits 21 to 25 needs to be increased (step S41). For example, in a case where in step S4, the peak value of the driving waveform in accordance with the ejecting frequency calculated from the conveying speed is higher than the peak value of the current driving waveform, the controller 7 determines that the output voltage value of each of the power source circuits 21 to 25 needs to be increased (step S41: YES). On the other hand, in a case where in step S4, the peak value of the driving waveform in accordance with the ejecting frequency calculated from the conveying speed is lower than the peak value of the current driving waveform, the controller 7 determines that the output voltage value of each of the power source circuits 21 to 25 needs to be decreased (step S41: NO).

In a case where the controller 7 determines that the output voltage value of each of the power source circuits 21 to 25 needs to be increased (step S41: YES), the controller 7 firstly increases the output voltage value of the power source circuit 26 (step S42). Then, after the controller 7 has increased the output voltage value of the power source circuit 26, the controller 7 increases the output voltage value of each of the power source circuits 21 to 25 (step S43). Namely, the controller 7 changes the output voltage value of the power source circuit 26 and the output voltage value of each of the power source circuits 21 to 25, such that the difference between the output voltage value of the power source circuit 26 and the output voltage value of each of the power source circuits 21 to 25 is increased (step S42) and then returned to an original value of the difference (step S43). Then, after increasing the output voltage value of each of the power source circuits 21 to 25, the controller 7 returns the procedure to step S3. Note that as described above, the output voltage value of each of the power source circuits 21 to 26 can be changed by the FPGA 51 and the D/A converter 20.

In such a case where only the output voltage value of each of the power source circuits 21 to 25 is increased and the output voltage value of the power source circuit 26 is not increased, the difference in potential between each of the individual electrodes 134 and the high potential electrode 135 becomes small, and thus the operation of each of the driving elements 111 is changed before and after increasing only the output voltage value of each of the power source circuits 21 to 25. Further, each of the driving elements 111 has the above-described configuration (see FIGS. 8 to 10), and voltage, which is higher than the voltage applied to each of the individual electrodes 134, needs to be applied to the high potential electrode 135 all the time. Provided that the output voltage value of each of the power source circuits 21 to 25 is increased before increasing the output voltage value of the power source circuit 26, the difference between the output voltage value of each of the power source circuits 21 to 25 and the output value of the power source circuit 26 becomes small, as compared with the difference before the increase of the output voltage value of each of the power source circuits 21 to 25, leading to such a possibility that the output voltage value of each of the power source circuits 21 to 25 might temporarily exceed the output voltage value of the power source circuit 26. Further, as depicted in FIG. 6, the power source circuits 21 to 25 and the power source circuit 26 share the input power source IPS. Accordingly, immediately after the output voltage value of each of the power source circuits 21 to 25 has been increased, not only the output voltage value of each of the power source circuits 21 to 25 but also the output voltage value of the power source circuit 26 becomes unstable, leading to a possibility that the output voltage value of each of the power source circuits 21 to 25 might temporarily exceed the output voltage value of the power source circuit 26. In this situation, such a possibility arises that potential higher than the potential applied to the high potential electrode 135 might be applied to each of the individual electrodes 134, and that the operation of each of the driving elements 111 might be changed temporarily. Considering such a possibility, in the present embodiment, in a case where the output voltage value of each of the power source circuits 21 to 25 needs to be increased, the output voltage value of the power source circuit 26, which is set to be higher than the output voltage value of each of the power source circuits 21 to 25, is firstly increased (step S42) and then the output voltage value of each of the power source circuits 21 to 25 is increased (step S43). With this, the output voltage value of each of the power source circuits 21 to 25 can be increased while maintaining a state that the output voltage value of the power source circuit 26 is higher than the output voltage value of each of the power source circuits 21 to 25, and the difference in potential between each of the individual electrodes 134 and the high potential electrode 135 can be maintained to be constant before and after changing the output voltage value of each of the power source circuits 21 to 26. As a result, the operation of each of the driving elements 111 is stabilized, thereby maintaining the desired quality of printing. Further, as described above, the input terminals of the respective power source circuits 21 to 25 are connected in parallel to the output terminal 26*d* of the power source circuit 26. In the present embodiment, the output voltage value of the power source circuit 26 is first increased, and then the output voltage value of each of the power source circuits 21 to 25 is increased. Thus, the output voltage value of each of the power source circuits 21 to 25 can be increased in a state that the output voltage value of the power source circuit 26 is stabilized.

On the other hand, in a case where the controller 7 determines that the output voltage value of each of the power source circuits 21 to 25 needs to be decreased (step S41: NO), the controller 7 firstly decreases the output voltage value of each of the power source circuits 21 to 25 (step S44). Further, after decreasing the output voltage value of each of the power source circuits 21 to 25, the controller 7 decreases the output voltage value of the power source circuit 26 (step S45). Namely, the controller 7 changes the output voltage value of each of the power source circuits 21 to 25 and the output voltage value of the power source circuit 26, such that the difference between the output voltage value of the power source circuit 26 and the output voltage value of each of the power source circuits 21 to 25 is increased (step S44) and then returned to the original value of the difference (step S45). Further, after decreasing the output voltage value of the power source circuit 26, the controller 7 returns the procedure to step S3.

In such a case where only the output voltage value of each of the power source circuits 21 to 25 is decreased and where the output voltage value of the power source circuit 26 is not decreased, the difference in potential between the each of the individual electrodes 134 and the high potential electrode 135 becomes great, and thus the operation of each of the driving elements 111 is changed before and after decreasing only the output voltage value of each of the power source circuits 21 to 25. Further, as described above, the potential higher than the potential applied to each of the individual electrodes 134 needs to be applied to the high potential electrode 135 all the time. Provided that the output voltage value of the power source circuit 26 is decreased before the output voltage value of each of the power source circuits 21 to 25 is decreased, the difference between the output voltage value of each of the power source circuits 21 to 25 and the output value of the power source circuit 26 becomes small, as compared with the difference before the decrease, leading to such a possibility that the output voltage value of the power source circuit 26 might temporarily become smaller than the output voltage value of each of the power source circuits 21 to 25. Further, as depicted in FIG. 6, the power source circuits 21 to 25 and the power source circuit 26 share the input power source IPS. Accordingly, immediately after the output voltage value of the power source circuit 26 has been decreased, not only the output voltage value of the power source circuit 26 but also the output voltage value of each of the power source circuits 21 to 25 becomes unstable, leading to such a possibility that the output voltage value of the power source circuit 26 might temporarily become smaller than the output voltage value of each of the power source circuits 21 to 25. In this situation, such a possibility arises that potential higher than the potential applied to the high potential electrode 135 might be applied to each of the individual electrodes 134, and that the operation of each of the driving elements 111 might be changed temporarily. Considering such a possibility, in the present embodiment, in a case where the output voltage value of each of the power source circuits 21 to 25 needs to be decreased, the output voltage value of each of the power source circuits 21 to 25 is firstly decreased (step S44) and then the output voltage value of the power source circuit 26, which is set to be higher than the output voltage value of each of the power source circuits 21 to 25, is decreased (step S45). With this, the output voltage value of each of the power source circuits 21 to 25 can be decreased while maintaining a state that the output voltage value of the power source circuit 26 is higher than the output voltage value of each of the power source circuits 21 to 25, and the difference in potential between each of the individual electrodes 134 and the high potential electrode 135 can be maintained to be constant before and after changing the output voltage value of each of the power source circuits 21 to 26. As a result, the operation of each of the driving elements 111 is stabilized, thereby maintaining the desired quality of printing. Further, the output voltage value of each of the power source circuits 21 to 25 is firstly decreased before the output voltage value of the power source circuit 26 is decreased, thereby decreasing the output voltage value of each of the power source circuits 21 to 25 in a state that the output voltage value of the power source circuit 26 is stabilized.

Further, in step S4, in a case where the controller 7 determines that the output voltage value of each of the power source circuits 21 to 25 does not need to be changed (step S4: NO), the controller 7 determines whether the printing process based on the print data is ended (step S5). In a case where the controller 7 determines that the printing process based on the print data is not ended (step S5: NO), the controller 7 returns the procedure to step S3. On the other hand, in a case where the controller 7 determines that the printing process based on the print data is ended (step S5: YES), the series of processing steps of the printing is ended.

Next, a process of each of steps S42 to S45 will be specifically described while using an example depicted in FIGS. 12A and 12B and FIGS. 13A and 13B.

Figures 12A, 12B:
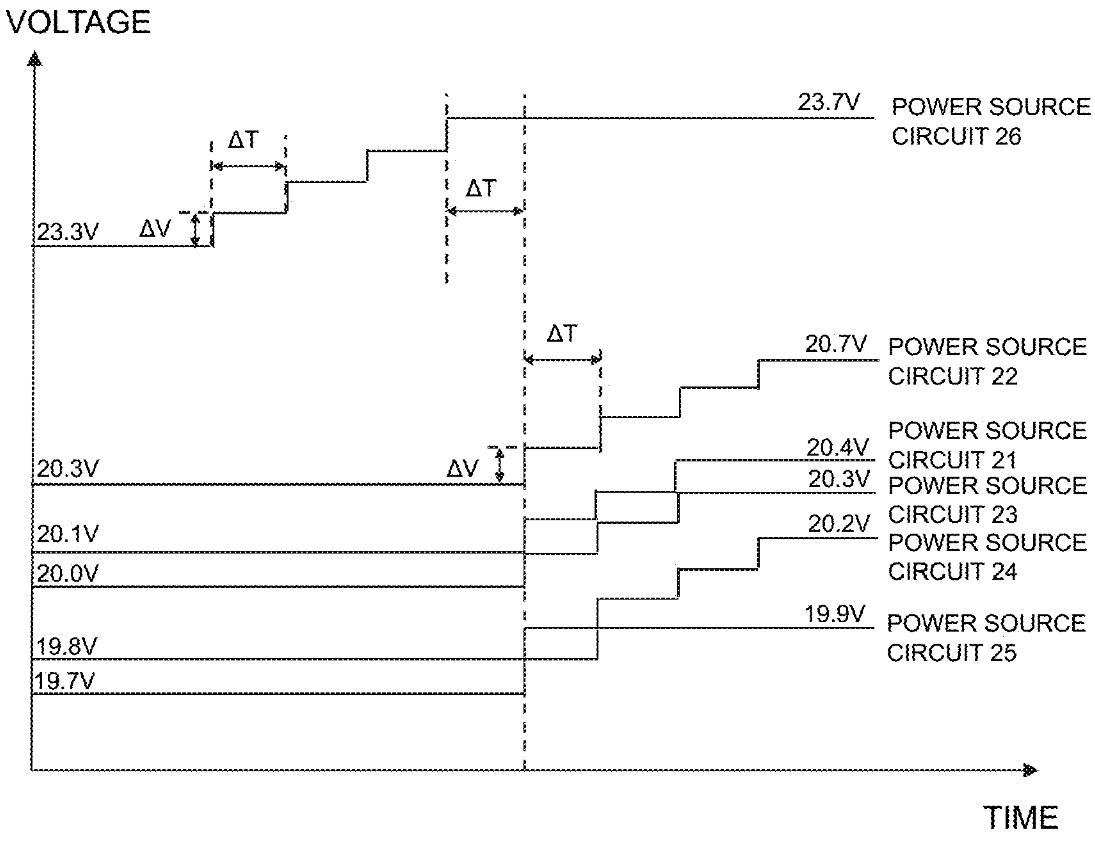
FIG. 12A is a table indicating examples of voltage values in a case of increasing an output voltage value of each of power source circuits.
FIG. 12B is a view depicting a situation in which the output voltage value of each of the power source circuits is increased with a lapse of time.

First, a case of increasing the output voltage value of each of the power source circuits 21 to 26 as depicted in FIG. 12A will be described. The output voltage values of the power source circuits 21 to 26 are previously set, respectively, to 20.1 V, 20.3 V, 20.0 V, 19.8 V, 19.7 V, and 23.3 V. Namely, the output voltage value of the power source circuit 26 is set to be higher than the output voltage value of the power source circuit 22, which has the highest output voltage value among the power source circuits 21 to 25. Further, such a case is presumed that each of the output voltage values of the power source circuits 21 to 26 needs to be increased to a target value thereof, as the conveying speed increases. Specifically, such a case is presumed that the output voltage values of the power source circuits 21 to 26 need to be increased, respectively, to 20.4 V, 20.7 V, 20.3 V, 20.2 V, 19.9 V, and 23.7 V. Note that the target value of each of the output voltage values of the power source circuits 21 to 26 is a value previously determined based on actual measurement, and is stored, for example, in the non-volatile memory 52. Further, also after the change to the target value, the output voltage value of the power source circuit 26 is set to be higher than the output voltage value of the power source circuit 22, which has the highest output voltage value among the power source circuits 21 to 25.

In this case, as depicted in FIG. 12B, the controller 7 firstly increases the output voltage value of the power source circuit 26 by ΔV every time a time ΔT elapses, thereby increasing the output voltage value from 23.3 V to 23.7 V (step S42). Then, after the output voltage value of the power source circuit 26 reaches the target value of 23.7 V and the time ΔT elapses, the controller 7 starts to change the output voltage values of the power source circuits 21 to 25 at the same time. Specifically, the controller 7 increases the output voltage value of each of the power source circuits 21 to 25 by the ΔV every time the time ΔT elapses until the output value reaches the target value thereof (step S43), in a similar manner as in the case of the power source circuit 26. Note that in FIG. 12B, for example, the setting can be made such that the time ΔT=10 ms and the ΔV=0.1 V.

Figures 13A, 13B:
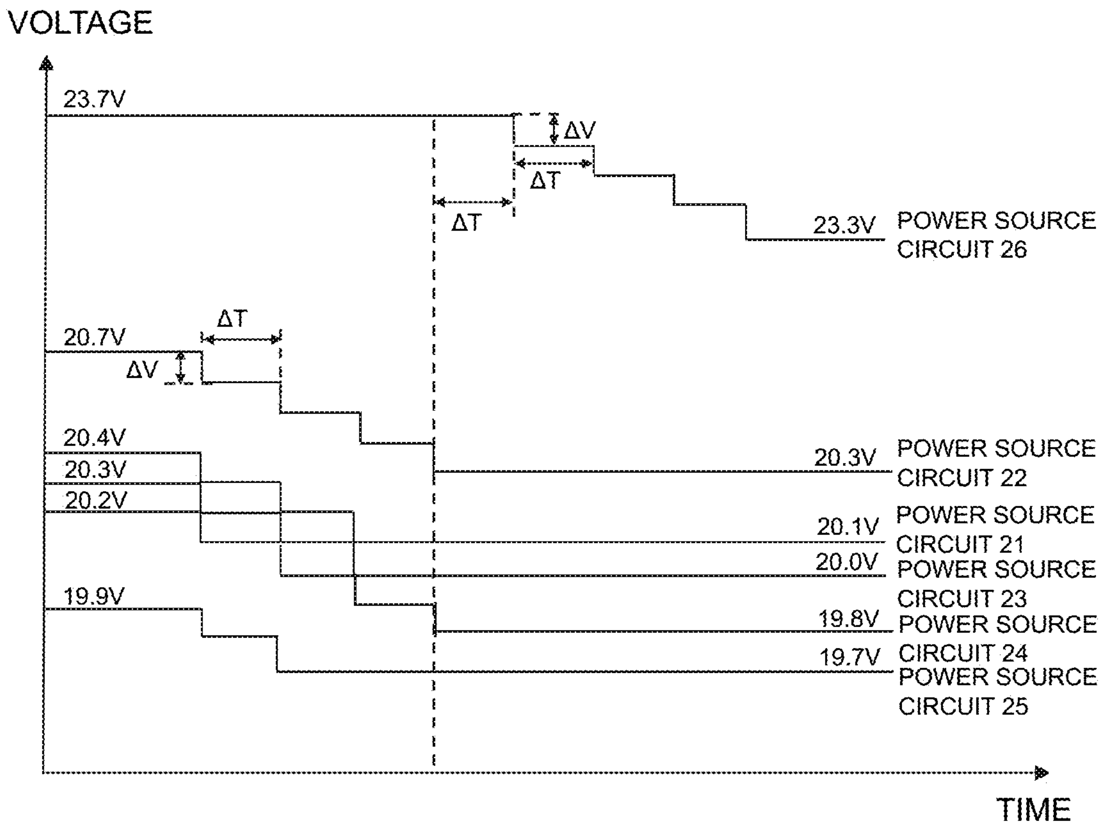
FIG. 13A is a table indicating examples of voltage values in a case of decreasing the output voltage value of each of the power source circuits.
FIG. 13B is a view depicting a situation in which the output voltage value of each of the power source circuits is decreased with a lapse of time.

Next, a case of decreasing the output voltage value of each of the power source circuits 21 to 26 as depicted in FIG. 13A will be described. The output voltage values of the power source circuits 21 to 26 are previously set, respectively, to 20.4 V, 20.7 V, 20.3 V, 20.2 V, 19.9 V, and 23.7 V. Namely, the output voltage value of the power source circuit 26 is set to be higher than the output voltage value of the power source circuit 22, which has the highest output voltage value among the power source circuits 21 to 25. Further, such a case is presumed that each of the output voltage values of the power source circuits 21 to 26 needs to be decreased to a target value thereof, as the conveying speed decreases. Specifically, such a case is presumed that the output voltage values of the power source circuits 21 to 26 need to be decreased, respectively, to 20.1 V, 20.3 V, 20.0 V, 19.8 V, 19.7 V, and 23.3 V. Note that the target value of the output voltage value of each of the power source circuits 21 to 26 is also a value previously determined based on actual measurement, and is stored, for example, in the non-volatile memory 52. Further, also after the change to the target value, the output voltage value of the power source circuit 26 is set to be higher than the output voltage value of the power source circuit 22, which has the highest output voltage value among the power source circuits 21 to 25.

In this case, as depicted in FIG. 13B, the controller 7 firstly starts to decrease the output voltage values of the power source circuits 21 to 25 at the same time. Specifically, the controller 7 decreases the output value of each of the power source circuits 21 to 25 by ΔV every time a time ΔT elapses until the output voltage value reaches the target value thereof (step 44). Further, after the output voltage values of the power source circuits 22 and 24 in which the difference between the output voltage value before the change and the output voltage value after the change is greatest among the power source circuits 21 to 25 reach the target values thereof (20.3 V and 19.8 V, respectively) and the time ΔT elapses, the controller 7 decreases the output voltage value of the power source circuit 26 by the ΔV every time the time ΔT elapses, thereby decreasing the output voltage value from 23.7 V to 23.3 V (step S45). Note that also in FIG. 13B, for example, the setting can be made such that the time ΔT=10 ms and the ΔV=0.1 V.

As described in the foregoing, in the present embodiment, in a case where the controller 7 changes the output voltage value of each of the power source circuits 21 to 26, the controller 7 changes the output voltage value of each of the power source circuits 21 to 26 in a stepwise manner by the ΔV every time the time ΔT elapses. With this, the voltage value of each of the power source circuits 21 to 26 can be stabilized in a short period of time, every time the voltage value is changed by ΔV. Further, also in the case of changing the output voltage values of the power source circuits 21 to 26 at the time for the plurality of heads 11 included in each of the line heads 4, the variation in the load on the input power source IPS of each of the line heads 4 can be decreased. Furthermore, since the driving state of each of the driving elements 111 is changed stepwise, the ejecting state of the ink droplet is also changed stepwise. With this, the lowering in the quality of printing, which would be otherwise caused by a sudden change in the ejecting state of the ink droplet, can be prevented. Note that from the viewpoint of stabilizing the voltage values of the respective power source circuits 21 to 26 in the short period of time, and from the viewpoint of decreasing the variation in the load on the input power source IPS of each of the line heads 4, the ΔV is preferably 0.5 V or less, and is more preferably 0.1 V or less. Further, from the viewpoint of preventing any sudden change in the output voltage value of each of the power source circuits 21 to 26, the time ΔT is preferably 2 ms or more.

Although the embodiment and modifications thereof of the present teaching are described in the foregoing, the present teaching is not limited to the above-described embodiment and the modifications thereof; various design changes may be made to the embodiment, without departing from the claims.

In a case where the controller 7 changes the output voltage value of each of the power source circuits 21 to 25 in step S43 and step S44 of the above-described embodiment, the controller 7 starts to change all the output voltages values of the power source circuits 21 to 25 at the same time. The present teaching, however, is not limited to or restricted by this. For example, the timings at which the changing of the output voltage values of the driving power source circuits 21 to 25 are started, respectively, may be mutually different. Alternatively, the changing of the output voltage value may be started at the same time with respect to a part of the power source circuits 21 to 25 at a certain timing, and the changing of the output voltage value is started at the same time with respect to the remaining part of the power source circuits 21 to 25 at another timing different from the certain timing. Note that from a viewpoint of stabilizing the output voltage value of the power source circuit 26, the changing of the output voltage value is started preferably at the same time with respect to a part of the power source circuits 21 to 25 at the certain timing, and the changing of the output voltage value is started at the same time with respect to the remaining part of the power source circuits 21 to 25 at another timing different from the certain timing, rather than making the timings of starting to change the output voltage values of the respective driving power source circuits 21 to 25 mutually different.

In the above-described embodiment, although the controller 7 determines whether the changing of the output voltage value of each of the power source circuits 21 to 25 is necessary, based on the conveying speed of the medium M, the present teaching is not limited to this. For example, the printing apparatus 1 may include a densitometer configured to measure the density of an image printed on the medium M, and the controller 7 may be configured to determine whether the changing of the output voltage value of each of the power source circuits 21 to 25 is necessary, based on the density of the image measured by the densitometer. For example, in a case where the density of the image becomes higher than a predetermined density, the controller 7 may decrease the output voltage value of each of the power source circuits 21 to 26 so that the density of the image becomes low. In a case where the density of the image becomes lower than the predetermined density, the controller 7 may increase the output voltage value of each of the power source circuits 21 to 26 so that the density of the image becomes high. Alternatively, the controller 7 may determine whether the changing of the output voltage value of each of the power source circuits 21 to 25 is necessary, based on the conveying speed of the medium M and the density of the image measured by the densitometer.

In the above-described embodiment and the modifications, the printing apparatus 1 performs the printing with respect to the medium in a so-called line head system wherein the ink is ejected from the line heads 4 which are fixed with respect to the printing apparatus 1 and which are long in the width direction. However, the printing apparatus 1 may perform the printing with respect to the medium in a so-called serial head system wherein an ink-jet head 11 is moved in the width direction by a carriage.

The above-described embodiment and the modifications have been described regarding the example wherein the present teaching is applied to the heads 11 configured to eject the ink from the nozzles 11*a*. The present teaching, however, is not limited to this. The present teaching is also applicable to a head which is different from the ink-jet head and which is configured to eject, from the nozzles 11*a*, liquid different from the ink.

What is claimed is:

1. A printing method using a printing apparatus, the printing apparatus including:

a liquid ejecting head including: a channel substrate having an individual channel; and a piezoelectric actuator having an individual electrode, a high potential electrode, and a low potential electrode, and configured to apply pressure to liquid inside the individual channel;

a driving power source circuit electrically connected to the individual electrode;

a high potential power source circuit electrically connected to the high potential electrode; and a conveyor configured to convey a medium, the printing method, comprising:

ejecting the liquid from the liquid ejecting head with respect to the medium conveyed by the conveyor so as to print an image on the medium; and changing an output voltage value of the driving power source circuit and an output voltage value of the high potential power source circuit while printing the image on the medium.

2. The printing method according to claim 1, wherein in the changing of the output voltage value of the driving power source circuit and the output voltage value of the high potential power source circuit, the output voltage value of the driving power source circuit and the output voltage value of the high potential power source circuit are increased respectively, or the output voltage value of the driving power source circuit and the output voltage value of the high potential power source circuit are decreased respectively.

3. The printing method according to claim 1, wherein a timing of changing the output voltage value of the driving power source circuit and a timing of changing the output voltage value of the high potential power source circuit are different.

4. The printing method according to claim 3, wherein after changing one of the output voltage value of the driving power source circuit and the output voltage value of the high potential power source circuit has been finished, changing the other of the output voltage value of the driving power source circuit and the output voltage value of the high potential power source circuit is started.

5. The printing method according to claim 1, wherein the output voltage value of the driving power source circuit and the output voltage value of the high potential power source circuit are changed, such that after difference between the output voltage value of the driving power source circuit and the output voltage value of the high potential power source circuit is increased from an original value of the difference, the difference between the output voltage value of the driving power source circuit and the output voltage value of the high potential power source circuit is returned to the original value.

6. The printing method according to claim 5, wherein after the output voltage value of the high potential power source circuit has been increased, the output voltage value of the driving power source circuit is increased.

7. The printing method according to claim 5, wherein after the output voltage value of the driving power source circuit has been decreased, the output voltage value of the high potential power source circuit is decreased.

8. The printing method according to claim 1, wherein before changing the output voltage value of the driving power source circuit and the output voltage value of the high potential power source circuit, the output voltage value of the high potential power source circuit is higher than the output voltage value of the driving power source circuit, and after changing the output voltage value of the driving power source circuit and the output voltage value of the high potential power source circuit, the output voltage value of the high potential power source circuit is higher than the output voltage value of the driving power source circuit.

9. The printing method according to claim 8, the printing apparatus further including a plurality of driving power source circuits having mutually different output voltage values, the driving power source circuit being included in the driving power source circuits, wherein the output voltage value of the high potential power source circuit is higher than a highest output voltage value among the driving power source circuits.

10. The printing method according to claim 9, wherein in a case of changing the output voltage values of the driving power source circuits, the output voltage values of the driving power source circuits are changed at the same time.

11. The printing method according to claim 1, wherein each of the output voltage value of the driving power source circuit and the output voltage value of the high potential power source circuit is changed by a predetermined value every time a predetermined time elapses, up to a target value.

12. A printing apparatus comprising:

a liquid ejecting head including: a channel substrate having an individual channel; and a piezoelectric actuator having an individual electrode, a high potential electrode, and a low potential electrode, and configured to apply pressure to liquid inside the individual channel;

a driving power source circuit electrically connected to the individual electrode;

a high potential power source circuit electrically connected to the high potential electrode;

a conveyor configured to convey a medium; and a controller configured to control the liquid ejecting head and the conveyor, wherein the controller is configured to:

eject the liquid from the liquid ejecting head with respect to the medium conveyed by the conveyor so as to print an image on the medium; and change an output voltage value of the driving power source circuit and an output voltage value of the high potential power source circuit while printing the image on the medium.

* * * * *